United States Patent
Matsui

(10) Patent No.: US 8,837,018 B2
(45) Date of Patent: Sep. 16, 2014

(54) IMAGE SCANNING APPARATUS SCANNING DOCUMENT IMAGE AND IMAGE FORMING APPARATUS INCLUDING IMAGE SCANNING APPARATUS

(71) Applicant: Kyocera Document Solutions Inc., Osaka (JP)

(72) Inventor: Shinya Matsui, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 13/728,491

(22) Filed: Dec. 27, 2012

(65) Prior Publication Data
US 2013/0170002 A1 Jul. 4, 2013

(30) Foreign Application Priority Data

Dec. 28, 2011 (JP) ................................. 2011-288657

(51) Int. Cl.
*H04N 1/04* (2006.01)
*G03G 15/00* (2006.01)

(52) U.S. Cl.
CPC ............... *H04N 1/04* (2013.01); *G03G 15/605* (2013.01)

USPC ............ 358/498; 358/496; 358/474; 358/497

(58) Field of Classification Search
USPC .................... 358/498, 496, 474, 497
See application file for complete search history.

(56) References Cited

FOREIGN PATENT DOCUMENTS

| JP | 2001-203845 | * | 7/2001 | ............... H04N 1/00 |
| JP | 2006-311336 | | 11/2006 | |

* cited by examiner

*Primary Examiner* — Houshang Safaipour
(74) *Attorney, Agent, or Firm* — K&L Gates LLP

(57) ABSTRACT

An image scanning apparatus scanning a document image includes a document conveying unit, an image scanning unit, a foreign object detecting unit, a display unit, and a control unit. The document conveying unit feeds pages of a document loaded on a document feed tray one at a time. The image scanning unit scans each fed page of the document on a scanning face. The foreign object detecting unit detects whether a foreign object exists on the scanning face based on the image data on the page of the document scanned on the scanning face. The control unit causes the display unit to display the detection of a foreign object if a last page of the document loaded on the document feed tray is scanned and the foreign object on the scanning face is detected based on the image data on the last page of the document.

16 Claims, 3 Drawing Sheets

IMAGE SCANNING APPARATUS SCANNING DOCUMENT IMAGE AND IMAGE FORMING APPARATUS INCLUDING IMAGE SCANNING APPARATUS

INCORPORATION BY REFERENCE

This application is based upon, and claims the benefit of priority from, corresponding Japanese Patent Application No. 2011-288657 filed Dec. 28, 2011, the entire contents of which is incorporated herein by reference.

FIELD

The present disclosure relates to an image scanning apparatus that feeds a document to a scanning unit to scan a document image and an image forming apparatus using the image scanning apparatus.

BACKGROUND

In image scanning apparatuses using electrophotographic methods, documents fed on platen glasses by, for example, automatic document feeders (ADFs) are scanned by charge coupled device (CCD) line sensors that extend in a direction (primary scanning direction) orthogonal to a conveying direction (secondary scanning direction) of the documents. In such image scanning apparatuses, if foreign objects, such as dusts (paper powder, etc.) or dirt, or scratches exist at scanning positions (specific positions in the conveying direction of the documents) on the platen glasses stripe patterns (hereinafter also referred to as black stripes) that extend in the conveying direction of the documents will appear on the scanned images. Some image forming apparatuses including such image scanning apparatuses detect such black stripes and notify users when black stripes are detected. For example, document scanning apparatuses are proposed, which display guidance (cleaning guidance) to prompt the users to do cleaning in order to remove the causes of black stripes if the black stripes are detected a certain number of times while normal scanning of documents of multiple pages is performed a certain number of times.

The black stripes that are caused by adherence of the foreign objects on the platen glasses can be cleared by the documents that are conveyed on the platen glasses to remove the foreign objects. However, the cleaning guidance may be displayed despite the fact that the foreign objects are practically removed and the apparatuses are returned to the normal state wherein no black stripe occurs when the cleaning guidance is immediately displayed upon detection of the black stripes on any of the pages that are automatically fed by the ADFs. In this case, unnecessary cleaning of the platen glasses is caused to be performed. As a result, a vicious cycle occurs in which the coating on the platen glasses is peeled off causing minor irregularities on the surfaces of the platen glasses and the foreign objects are more easily adhered on the platen glasses due to the irregularities.

SUMMARY

According to an embodiment of the present disclosure, an image scanning apparatus is provided including a document conveying unit, an image scanning unit, a foreign object detecting unit, a display unit, and a control unit. The document conveying unit conveys pages of a document loaded on a document feed tray one at a time. The image scanning unit scans each page of the document fed by the document conveying unit on a certain scanning face. The foreign object detecting unit detects whether a foreign object exists on the scanning face based on the image data on the scanned document. The display unit displays information concerning a result of the detection of the foreign object. The control unit causes the display unit to display the detection of a foreign object if a last page of the document loaded on the document feed tray is scanned on the scanning face of the image scanning unit and the foreign object on the scanning face is detected based on the image data on the last page of the document which is scanned.

According to another embodiment of the present disclosure, an image forming apparatus is provided that includes a document conveying unit, an image scanning unit, a foreign object detecting unit, a display unit, a control unit, and an image forming unit. The document conveying unit feeds pages of a document loaded on a document feed tray one at a time. The image scanning unit scans each page of the document fed by the document conveying unit on a certain scanning face. The foreign object detecting unit detects whether a foreign object exists on the scanning face based on the image data on the page of the scanned document. The display unit displays information concerning a result of the detection of the foreign object. The control unit causes the display unit to display the detection of a foreign object if a last page of the document loaded on the document feed tray is scanned on the scanning face of the image scanning unit and the foreign object on the scanning face is detected based on the image data on the last page of the document which is scanned. The image forming unit forms an image on recording paper based on the image data on the page of the document scanned by the image scanning unit.

Additional features and advantages are described herein, and will be apparent from the following Detailed Description and the figures.

DETAILED DESCRIPTION

Embodiments of the present disclosure will herein be described with reference to the attached drawings.

Figure 1:
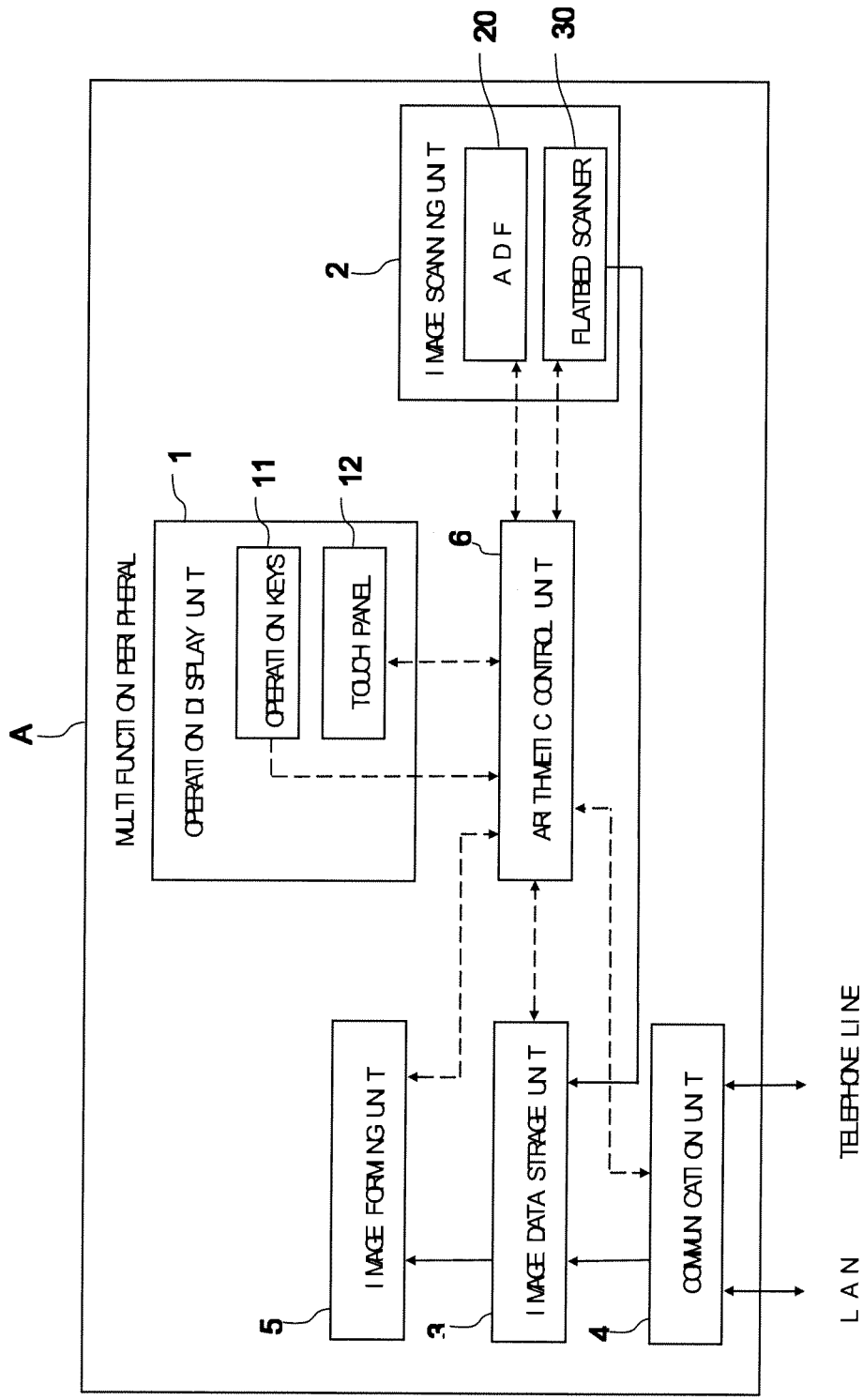
FIG. 1 is a block diagram showing an exemplary functional configuration of a multifunction peripheral according to an embodiment of the present disclosure.

A multifunction peripheral A according to an embodiment is an electrophotographic image forming apparatus that forms an image on recording paper. FIG. 1 is a block diagram showing an exemplary configuration of the multifunction peripheral A. Referring to FIG. 1, the multifunction peripheral A includes an operation display unit 1, an image scanning unit 2, an image data storage unit 3, a communication unit 4, an image forming unit 5, and an arithmetic control unit 6. The operation display unit 1 is a display unit according to the present embodiment.

The operation display unit 1 includes operation keys 11 and a touch panel 12 and functions as a man-machine interface that associates a user of the multifunction peripheral A with the multifunction peripheral A. The operation display unit 1 supplies an operation instruction inputted by the user using the operation keys 11 or operation buttons displayed on the touch panel 12 to the arithmetic control unit 6 as an operation signal and displays various image on the touch panel 12 based on the control signal supplied from the arithmetic control unit 6.

Figure 2:
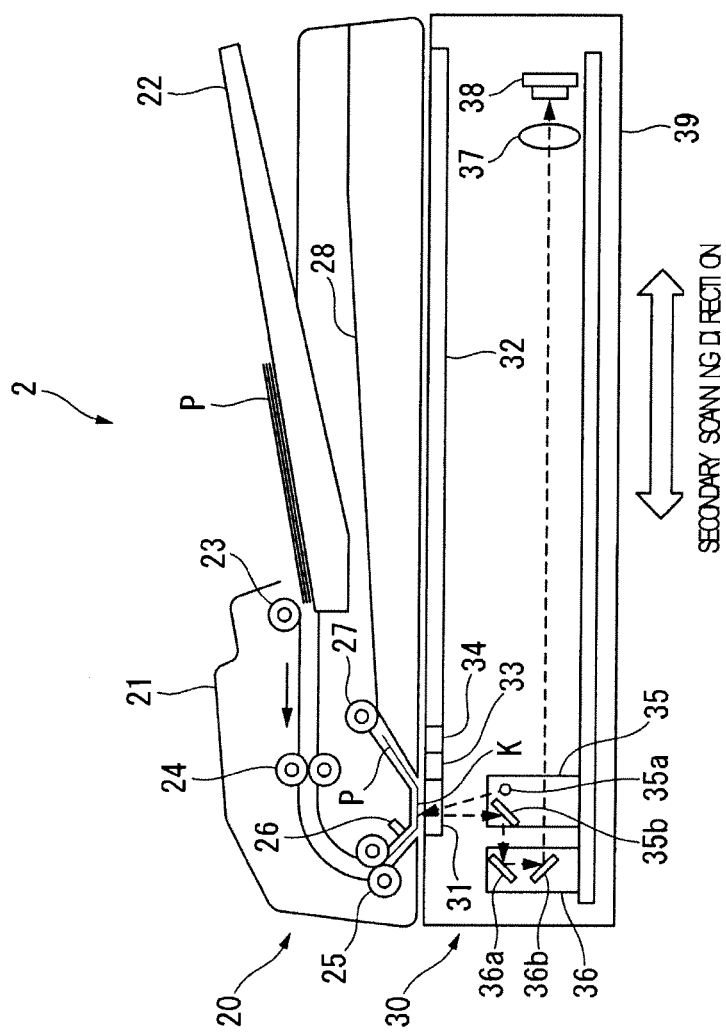
FIG. 2 is a cross-sectional view of an image scanning unit in the embodiment of the present disclosure.

The image scanning unit 2 includes an ADF 20 and a flatbed scanner 30, as illustrated in FIGS. 1 and 2. The image scanning unit 2 scans a surface image (document image) of each page of a document P fed by the ADF 20 or each page of the document P loaded on the flatbed scanner 30 by the user based on the control signal supplied from the arithmetic control unit 6 to convert the document image into document image data and supplies the document image data to the image data storage unit 3.

The ADF 20 sequentially and automatically feeds multiple pages of the document P loaded in a document feed tray 22 one at a time to a scanning position of the document image. As illustrated in FIG. 2, the ADF 20 includes a platen cover 21, the document feed tray 22, a pickup roller 23, a pair of conveying rollers 24, a pair of registration rollers 25, a document detector 26, a discharge roller 27, and a document output tray 28.

The platen cover 21 is a movable cover mounted on the main body of the ADF 20 in order to, for example, remove a document P that has jammed during the paper feed. The platen cover 21 is capable of being opened and closed. FIG. 2 illustrates when the platen cover 21 is closed. The user is capable of opening the platen cover 21 to access the pickup roller 23, the conveying rollers 24, the registration rollers 25, and so on. The document feed tray 22 is a container in which the pages of the document P to be scanned are housed.

The pickup roller 23 is a drive roller that picks up the pages of the document P loaded on the document feed tray 22 one by one and feeds the page of the document P which is picked up to the conveying rollers 24. The conveying rollers 24 are drive rollers that feed each page of the document P supplied from the pickup roller 23 to the registration rollers 25. The registration rollers 25 are drive rollers that feed each page of the document P supplied from the conveying rollers 24 to the discharge roller 27 at certain timing.

A reading opening K is formed between the registration rollers 25 and the discharge roller 27, as illustrated in FIG. 2. The reading opening K is a strip-shaped opening that is provided at a certain width in the direction in which the document is fed (the secondary scanning direction) in the bottom part of the ADF 20, that is, in a part where the ADF 20 opposes the flatbed scanner 30. The reading opening K is a portion where the surface of each page of the document P that is automatically fed by the ADF 20 is exposed to the flatbed scanner 30. The document detector 26 is provided between the reading opening K and the registration rollers 25. The document detector 26 detects the leading position of each page of the document P fed from the registration rollers 25 and supplies a detection signal to the arithmetic control unit 6. The discharge roller 27 is a drive roller that feeds each page of the document P supplied from the pickup roller 23 to the document output tray 28. The document output tray 28 is where the pages of the document P supplied from the discharge roller 27 are housed.

The flatbed scanner 30 includes a first platen glass 31, a second platen glass 32, a white reference plate 33, a document size indicating plate 34, a full rate carriage 35, a half rate carriage 36, a condenser lens 37, a CCD line sensor 38, and a scanner housing 39, as illustrated in FIG. 2. The flatbed scanner 30 scans each page of the document P which is automatically fed by the ADF 20 or the page of the document P loaded on the second platen glass 32 by the user.

The first platen glass 31 is a transparent plate glass fitted in a strip-shaped opening located on the left side of the upper face of the scanner housing 39 and opposes the reading opening K of the ADF 20 described above. The multiple pages of the document P sequentially fed from the registration rollers 25 to the discharge roller 27 in the ADF 20 sequentially pass on the first platen glass 31. The second platen glass 32 is a transparent plate glass fitted into a rectangular opening located on the right side of the strip-shaped opening into which the first platen glass 31 is fitted and which is located on the upper face of the scanner housing 39. The document P is loaded on the second platen glass 32 by the user in an image scanning process in which the ADF 20 is not used.

The white reference plate 33 is a white plate that is located between the first platen glass 31 and the second platen glass 32 on the upper face of the scanner housing 39 and that is used for known shading compensation. The document size indicating plate 34 is a mark that is located between the second platen glass 32 and the white reference plate 33 on the upper face of the scanner housing 39 and that indicates a loading position corresponding to a document size when the document P is loaded on the second platen glass 32 by the user.

The full rate carriage 35 includes a light source 35a that emits illuminating light obliquely upward and a first mirror 35b that reflects light reflected from the document P toward the half rate carriage 36. The full rate carriage 35 is movably mounted on a rail extending in a horizontal direction in FIG. 2 (the secondary scanning direction). In the scanning of each page of the document P automatically fed by the ADF 20, the full rate carriage 35 is fixed below the first platen glass 31, as illustrated in FIG. 2. The full rate carriage 35 irradiates the document P on the first platen glass 31, which passes through the reading opening K, with the light emitted from the light source 35a as the illuminating light and reflects reflected light (scanning light) resulting from the reflection of the illuminating light from the surface of the document P toward the half rate carriage 36 with the first mirror 35b.

When scanning the document P loaded on the second platen glass 32, the full rate carriage 35 irradiates the document P with the illuminating light while the full rate carriage 35 is moving in the horizontal direction in FIG. 2 (the secondary scanning direction) below the second platen glass 32 and reflects the scanning light sequentially reflected from the pages of the document P toward the half rate carriage 36 with the first mirror 35b.

The half rate carriage 36 includes a second mirror 36a that reflects the scanning light incident from the first mirror 35b downward and a third mirror 36b that reflects the scanning light incident from the second mirror 36a toward the condenser lens 37. The half rate carriage 36 is mounted on the same rail as in the full rate carriage 35 so as to be positioned on the left side of the full rate carriage 35. When scanning each page of the document P automatically fed by the ADF 20, the half rate carriage 36 is fixed at a position that is apart from the full rate carriage 35 by a certain distance on the left side of the full rate carriage 35 below the first platen glass 31, as illustrated in FIG. 2. When scanning the document P loaded on the second platen glass 32, the half rate carriage 36 moves in the horizontal direction in FIG. 2 (the secondary scanning direction), in the same manner as in the full rate carriage 35.

The condenser lens 37 condenses the scanning light incident from the third mirror 36b to form an image on a light receiving face of the CCD line sensor 38. The CCD line sensor 38 is a line sensor in which CCD light receiving elements of a certain number are linearly arranged (arranged in a line). The CCD line sensor 38 photoelectrically converts the scanning light sequentially received on the light receiving face into an electrical signal and supplies the electrical signal to the image data storage unit 3 as the document image data corresponding to the document image. Broken-line arrows illustrated in FIG. 2 indicate the optical paths of the illuminating light and the scanning light in the automatic feed of the pages of the document P by the ADF 20. The scanner housing 39 is a box housing in which the full rate carriage 35, the half rate carriage 36, the condenser lens 37, and the CCD line sensor 38 are housed.

The image data storage unit 3 is, for example, a semiconductor memory or a hard disk apparatus. The image data storage unit 3 stores the document image data, print image data received from an external client computer by the communication unit 4, and facsimile image data received from an external facsimile apparatus by the communication unit 4 on the basis of the control signal supplied from the arithmetic control unit 6. The image data storage unit 3 reads out the image data that is stored on the basis of the control signal supplied from the arithmetic control unit 6 and supplies the image data that is read out to the image forming unit 5.

The communication unit 4 communicates with a facsimile apparatus via a telephone line or with an external multifunction peripheral or a client computer, etc. via a local area network (LAN) based on the control signal supplied from the arithmetic control unit 6. In other words, the communication unit 4 has both a communication function conforming to a certain LAN standard and a communication function conforming to a facsimile standard, such as Group 3 (G3).

The image forming unit 5 includes a print engine (a photosensitive drum, a charging device, a developing device, a fixing roller, etc.) and so on. The image forming unit 5 feeds recording paper based on the control signal supplied from the arithmetic control unit 6 and forms a toner image on the recording paper based on the image data supplied from the image data storage unit 3. The image forming unit 5 processes the document image scanned by the image scanning unit 2 or the print target image received from each client computer or facsimile apparatus by the communication unit 4 as an individual job (print job) to form an image.

The arithmetic control unit 6 includes a central processing unit (CPU), a read only memory (ROM), a random access memory (RAM), an interface circuit that transmits and receives various signals to and from the above components, and so on. The arithmetic control unit 6 controls the entire operation of the multifunction peripheral A based on a control program stored in the ROM. The arithmetic control unit 6 detects a stripe pattern caused by adherence of a foreign object (dusts such as paper powder or dirt) on the first platen glass 31 (scanning face) and that extends in the secondary scanning direction of the scanned image (the direction corresponding to the conveying direction of the document in the scanning) as part of the above various arithmetic processes, as described in detail below. In this case, the arithmetic control unit 6 functions as a foreign object detecting unit. If a black stripe is detected on the page of the document P, which is last scanned, as the result of the scanning of the multiple pages of the document P, the arithmetic control unit 6 notifies the user of the detection of the black stripe. The arithmetic control unit 6 composes a notifying unit according to an embodiment with the operation display unit 1.

An exemplary operation of the multifunction peripheral A having the above configuration will now be described.

The overall operation of the multifunction peripheral A will be described first. For example, when the user sets the pages of the document P in the ADF 20 and operates the operation display unit 1 to instruct copying of the document P, the operation signal relating to the instruction is supplied from the operation display unit 1 to the arithmetic control unit 6. As a result, the arithmetic control unit 6 causes the image scanning unit 2 to perform the image scanning process in which each page of the document P is scanned.

Specifically, the arithmetic control unit 6 drives the pickup roller 23 to pick up pages of the document P in the document feed tray 22 one at a time and feeds each page of the document P, which is picked up, to the conveying rollers 24. The arithmetic control unit 6 drives the conveying rollers 24 to feed the page of the document P to the registration rollers 25. Simultaneously with the conveyance of the document P, the arithmetic control unit 6 moves the full rate carriage 35 and the half rate carriage 36 to the certain positions illustrated in FIG. 2. Then, the arithmetic control unit 6 drives the registration rollers 25 to feed the page of the document P supplied from the conveying rollers 24 to the reading opening K at certain timing and drives the light source 35*a* to irradiate the page of the document P with the light emitted from the light source 35*a*. As a result, the light emitted from the light source 35*a* is reflected from the page of the document P and is sequentially reflected from the first mirror 35*b*, the second mirror 36*a*, and the third mirror 36*b* to be incident on the condenser lens 37. The light is condensed on the light receiving face of the CCD line sensor 38 by the condenser lens 37.

Then, the arithmetic control unit 6 drives the CCD line sensor 38 to receive the light and stores the image data output from the CCD line sensor 38 in the image data storage unit 3 as the document image data about each page of the document P in synchronization with the timing when the page of the document P fed from the registration rollers 25 is detected by the document detector 26. Then, the arithmetic control unit 6 drives the discharge roller 27 to discharge the page of the document P fed from the registration rollers 25 via the reading opening K into the document output tray 28. Then, the arithmetic control unit 6 causes the image forming unit 5 to perform the process of forming the document image based on the document image data stored in the image data storage unit 3.

Figure 3:
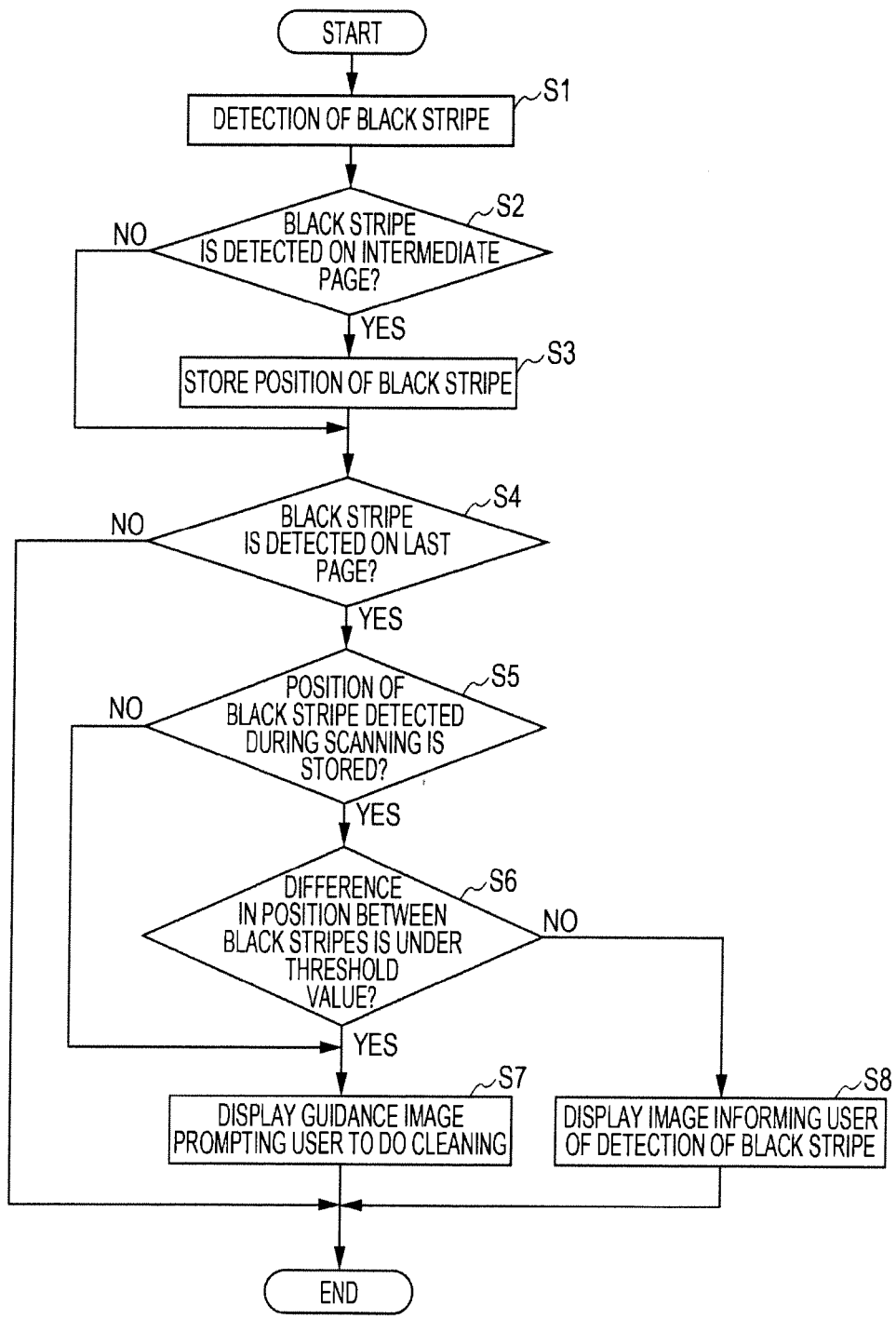
FIG. 3 is a flowchart illustrating an operational process performed by the multifunction peripheral according to an embodiment of the present disclosure.

The arithmetic control unit 6 performs the following process when the arithmetic control unit 6 causes the image scanning unit 2 to perform the image scanning process described above. FIG. 3 is a flowchart illustrating an operational process performed by the multifunction peripheral A according to an embodiment. Referring to FIG. 3, in Step S1, the arithmetic control unit 6 performs detection of a black stripe. For example, the arithmetic control unit 6 acquires images (in-document images) at specified positions near the leading edge and the trailing edge in the secondary scanning direction of the document P from the image data supplied from the CCD line sensor 38 and acquires an image (out-document image) between the page of the document P (preceding page) which is automatically fed to the scanning position by the ADF 20 first and the page of the document P (subsequent page) which is automatically fed to the scanning position by the ADF 20 subsequently to the preceding page. Then, the arithmetic control unit 6 compares the in-document images with the out-document image to detect a black stripe caused by a foreign object adhered to the first platen glass 31.

In Step S2, the arithmetic control unit 6 determines whether the black stripe is detected on an intermediate page, which is not the final page among the multiple pages of the document P, in the black stripe detection. If a black stripe is detected on an intermediate page among the multiple pages of the document P (YES in Step S2), in Step S3, the arithmetic control unit 6 stores the position of the black stripe. For example, when scanning ten pages of documents P, the arithmetic control unit 6 stores the position of the black stripe if the black stripe is detected during the scanning of the first to ninth pages of the document P. In other words, the arithmetic control unit 6 stores the position of the black stripe detected on a page of the document P scanned before the page (the tenth page) of the document P, which is last scanned. The position of the black stripe is indicated by the positions of pixels where the black stripe appears in the document image data, that is, the positions in the primary scanning direction of the pixels corresponding to the black stripe in the document image data output from the CCD line sensor 38. The black stripe is a stripe pattern that extends in the scanning direction of the document (the conveying direction of the document), and the position of the black stripe is indicated by the positions of pixels where the black stripe appears in the primary scanning direction, which is orthogonal to the scanning direction of the document in the document image data. If no black stripe is detected on an intermediate page among the multiple pages of the document P (NO in Step S2), the process skips Step S3 and the arithmetic control unit 6 does not store the position of the black stripe.

The arithmetic control unit 6 continues the image scanning process after Step S2 and Step S3. In Step S4, the arithmetic control unit 6 determines whether the black stripe is detected on the page of the document P, which is last scanned, after the scanning of the last page of the document P is completed. If no black stripe is detected on the page of the document P, which is scanned last (NO in Step S4), the process in FIG. 3 is terminated. If the black stripe is detected on the page of the document P, which is scanned last (YES in Step S4), in Step S5, the arithmetic control unit 6 determines whether the position of the black stripe detected during the scanning of the multiple pages of the document P is stored.

If the position of the black stripe detected during the scanning of the multiple pages of the document P is stored (YES in Step S5), in Step S6, the arithmetic control unit 6 compares the position of the black stripe detected on an intermediate page of the document P, which is not the last page among the multiple pages of the document P, with the position of the black stripe detected on the page of the document P, which is scanned last, to determine whether the difference in position between the black stripes is under a predetermined threshold value. The arithmetic control unit 6 compares the positions of the pixels where the black stripes appear in the document image data (the positions in the primary scanning direction in the document image data) with each other.

If the difference in position between the black stripes is under the predetermined threshold value (YES in Step S6), in Step S7, the arithmetic control unit 6 displays a guidance image prompting the user to do cleaning of the first platen glass 31 on the touch panel 12. For example, when the predetermined threshold value is ten pixels, the arithmetic control unit 6 displays the guidance image prompting the user to do cleaning of the first platen glass 31 on the touch panel 12 if the difference in position between the black stripes is under ten pixels. Since a foreign object is possibly adhered to the first platen glass 31 strongly or is possibly adhered to a position that is not in contact with the document that is fed when the difference in position between the black stripes is under the predetermined threshold value, the guidance image prompting the user to do cleaning of the first platen glass 31 is displayed on the touch panel 12.

If the difference in position between the black stripes is over the predetermined threshold value (NO in Step S6), in Step S8, the arithmetic control unit 6 displays an image informing the user of the detection of the black stripe on the touch panel 12. Specifically, if the difference in position between the black stripes is over the predetermined threshold value, the arithmetic control unit 6 displays only the image informing the user of the detection of the black stripe, without displaying the guidance image prompting the user to do cleaning of the first platen glass 31. Since the foreign object is possibly moving in contact with the document that is fed and the foreign object is not strongly adhered to the first platen glass 31 when the difference in position between the black stripes is over the predetermined threshold value, only the image informing the user of the detection of the black stripe is displayed on the touch panel 12.

If a black stripe is detected on the page of the document P, which is last scanned (YES in Step S4) and the position of the black stripe detected during the scanning of the multiple pages of the document P is not stored (NO in Step S5), the process skips Step S6. In Step S7, the arithmetic control unit 6 displays the guidance image prompting the user to do cleaning of the first platen glass 31 on the touch panel 12.

According to the embodiment described above, the detection of a black stripe is notified if a black stripe is detected on the page of the document P, which is scanned last. In other words, since the foreign object causing the black stripe may be removed by the conveyance of the subsequent pages of the document P even if a black stripe is detected on an intermediate page of the document P in the scanning of the multiple pages of the document P, the detection of the black stripe is not notified if no black stripe is detected on the page of the document P, which is scanned last. According to this embodiment, the occurrence of the black stripe is notified only when the user is required to address the occurrence of the black stripe, so that it is not necessary for the user to make unnecessary response and it is possible to improve the user-friendliness of the apparatus. For example, since it is not necessary for the user to make a response, such as the cleaning of the first platen glass 31, according to this embodiment, the first platen glass 31 is prevented from being damaged due to the cleaning. Accordingly, the foreign object is prevented from easily adhering to the first platen glass 31.

While the present disclosure is described in terms of specific embodiments, it will be clear that the present disclosure is not limited to these specific embodiments and that, for example, the following changes and modifications will be obvious to those skilled in the art.

(1) Although the position of the black stripe detected on an intermediate page during the scanning of the multiple pages of the document P is compared with the position of the black stripe detected on the page of the document P, which is scanned last, to display the guidance image prompting the user to do cleaning of the first platen glass 31 or the image notifying the user of the detection of the black stripe on the basis of the result of the comparison in the above embodiment, the present disclosure is not so limited. In other words, it is sufficient to notify the user of the detection of a black stripe if the black stripe is detected on the page of the document P, which is scanned last, as the result of the scanning of the multiple pages of the document P even without the comparison. Although the detection of a black stripe is not specifically notified if the black stripe is detected on an intermediate page of the document P, which is not the last page among the multiple pages of the document P, in the above embodiment, the detection of the black stripe may be notified in such a case.

(2) Although only the image notifying the user of the detection of the black stripe is displayed without displaying the guidance image prompting the user to clean the first platen glass 31 if the difference in position between the black stripes is over the predetermined threshold value in the above embodiment, the guidance image prompting the user to do cleaning may be displayed.

(3) Although the guidance prompting the user to clean the first platen glass 31 or the detection of the black stripe is notified by using the image in the above embodiment, the present disclosure is not limited to this method. For example, when the apparatus of the above embodiment includes a speaker, the arithmetic control unit 6 may notify the user of the detection of a black stripe or the guidance prompting the user to clean the first platen glass 31 using a sound outputted from the speaker.

(4) Although the threshold value used in the branch into Step S7 or Step S8 based on the difference in position between the black stripes is set to ten pixels as an example in the above embodiment, the present disclosure is not limited to the above setting. The threshold value may be larger than ten pixels or smaller than ten pixels. In particular, since the scanning range fitted into one pixel varies with the type of the apparatus, it is sufficient for the threshold value to be appropriately set in accordance with the range.

(5) Although the in-document images near the leading edge and the trailing edge in the secondary scanning direction of the document P (the direction corresponding to the conveying direction of the document in the scanning) are acquired and the in-document images are compared with the out-document image to estimate an occurrence of the black stripe in the above embodiment, the present disclosure is not limited to the above method. For example, one of the in-document images near the leading edge and the trailing edge in the secondary scanning direction of the document P (the direction corresponding to the conveying direction of the document in the scanning), that is, the image of one end in the secondary scanning direction of the document P (the direction corresponding to the conveying direction of the document in the scanning) may be compared with the out-document image to detect an occurrence of the black stripe. Alternatively, an occurrence of a black stripe may be detected by another method.

(6) Although the guidance image prompting the user to clean the first platen glass 31 is displayed on the touch panel 12 (Step S7 in FIG. 3) if a black stripe is detected on the page of the document P, which is scanned last (YES in Step S4 in FIG. 3) and the position of the black stripe detected during the scanning of the multiple pages of the document P is not stored (NO in Step S5 in FIG. 3) in the above embodiment, the image notifying the user of the detection of the black stripe may be displayed on the touch panel 12 (Step S8). Alternatively, the process in FIG. 3 may be terminated in this case.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image scanning apparatus comprising:
    an automatic document conveying unit configured to feed multiple pages of a document loaded on a document feed tray one at a time;
    an image scanning unit configured to scan each page of the document fed by the automatic document conveying unit on a certain scanning face;
    a foreign object detecting unit configured to detect whether a foreign object exists on the scanning face based on the image data on the page of the document scanned on the scanning face of the image scanning unit;
    a display unit configured to display information relating to a result of the detection of the foreign object; and
    a control unit configured to cause the display unit to display the detection of a foreign object if a last page of the document loaded on the document feed tray is scanned on the scanning face of the image scanning unit and the foreign object on the scanning face is detected based on the image data on the last page of the document which is scanned;
    wherein, if the last page of the document loaded on the document feed tray is scanned on the scanning face of the image scanning unit and no foreign object is detected on the scanning face based on the image data on the last page of the document which is scanned even when a page other than the last page of the document loaded on the document feed tray is scanned on the scanning face of the image scanning unit and a foreign object on the scanning face is detected based on the image data on the page other than the last page of the document which is scanned, the control unit does not cause the display unit to display the detection of the foreign object.

2. The image scanning apparatus according to claim 1, wherein the foreign object detecting unit detects a stripe pattern that extends in a scanning direction in the image data on the page of the document scanned by the image scanning unit to detect whether a foreign object exists on the scanning unit.

3. The image scanning apparatus according to claim 2, wherein, if the stripe pattern is detected in the image data on the last page of the document, the control unit compares the position of the stripe pattern in the image data on a page of the document, which is scanned before the last page of the document, with the position of the stripe pattern in the image data on the last page of the document to cause the display unit to display a guidance image prompting a user to clean the scanning face if a difference in position between the stripe patterns is under a predetermined threshold value.

4. The image scanning apparatus according to claim 2, wherein, if the stripe pattern is detected in the image data on the last page of the document, the control unit compares the position in a primary scanning direction of the stripe pattern in the image data on a page of the document, which is scanned before the last page of the document, with the position in the primary scanning direction of the stripe pattern in the image data on the last page of the document to cause the display unit to display a guidance image prompting a user to clean the scanning face if a difference in position between the stripe patterns is under a predetermined threshold value.

5. The image scanning apparatus according to claim 2, wherein, if the stripe pattern is detected in the image data on the last page of the document, the control unit compares the position of the stripe pattern in the image data on a page of the document, which is scanned before the last page of the document, with the position of the stripe pattern in the image data on the last page of the document to cause the display unit to display the detection of the stripe pattern if a difference in position between the stripe patterns is over a predetermined threshold value.

6. The image scanning apparatus according to claim 2, wherein, if the stripe pattern is detected in the image data on the last page of the document, the control unit compares the position in a primary scanning direction of the stripe pattern in the image data on a page of the document, which is scanned before the last page of the document, with the position in the primary scanning direction of the stripe pattern in the image data on the last page of the document to cause the display unit to display the detection of the stripe pattern if a difference in position between the stripe patterns is over a predetermined threshold value.

7. The image scanning apparatus according to claim 2, wherein, if the stripe pattern is detected in the image data on the last page of the document, the control unit compares the position of the stripe pattern in the image data on a page of the document, which is scanned before the last page of the document, with the position of the stripe pattern in the image data on the last page of the document to cause the display unit to display a guidance image prompting a user to clean the scanning face if a difference in position between the stripe patterns is over a predetermined threshold value.

8. The image scanning apparatus according to claim 2, wherein, if the stripe pattern is detected in the image data on the last page of the document, the control unit compares the position in a primary scanning direction of the stripe pattern in the image data on a page of the document, which is scanned before the last page of the document, with the position in the primary scanning direction of the stripe pattern in the image data on the last page of the document to cause the display unit to display a guidance image prompting a user to clean the scanning face if a difference in position between the stripe patterns is over a predetermined threshold value.

9. An image forming apparatus comprising:
an automatic document conveying unit configured to feed multiple pages of a document loaded on a document feed tray one at a time;
an image scanning unit configured to scan each page of the document fed by the automatic document conveying unit on a certain scanning face;
a foreign object detecting unit configured to detect whether a foreign object exists on the scanning face based on the image data on the page of the document scanned on the scanning face of the image scanning unit;
a display unit configured to display information concerning a result of the detection of the foreign object;
a control unit configured to cause the display unit to display the detection of a foreign object if a last page of the document loaded on the document feed tray is scanned on the scanning face of the image scanning unit and the foreign object on the scanning face is detected based on the image data on the last page of the document which is scanned; and
an image forming unit configured to form an image on recording paper based on the image data on the page of the document scanned by the image scanning unit;
wherein, if the last page of the document loaded on the document feed tray is scanned on the scanning face of the image scanning unit and no foreign object is detected on the scanning face based on the image data on the last page of the document which is scanned even when a page other than the last page of the document loaded on the document feed tray is scanned on the scanning face of the image scanning unit and a foreign object on the scanning face is detected based on the image data on the page other than the last page of the document which is scanned, the control unit does not cause the display unit to display the detection of the foreign object.

10. The image forming apparatus according to claim 9, wherein the foreign object detecting unit detects a stripe pattern that extends in a scanning direction in the image data on the page of the document scanned by the image scanning unit to detect whether a foreign object exists on the scanning unit.

11. The image forming apparatus according to claim 10, wherein, if the stripe pattern is detected in the image data on the last page of the document, the control unit compares the position of the stripe pattern in the image data on a page of the document, which is scanned before the last page of the document, with the position of the stripe pattern in the image data on the last page of the document to cause the display unit to display a guidance image prompting a user to do cleaning of the scanning face if a difference in position between the stripe patterns is under a predetermined threshold value.

12. The image forming apparatus according to claim 10, wherein, if the stripe pattern is detected in the image data on the last page of the document, the control unit compares the position in a primary scanning direction of the stripe pattern in the image data on a page of the document, which is scanned before the last page of the document, with the position in the primary scanning direction of the stripe pattern in the image data on the last page of the document to cause the display unit to display a guidance image prompting a user to clean the scanning face if a difference in position between the stripe patterns is under a predetermined threshold value.

13. The image forming apparatus according to claim 10, wherein, if the stripe pattern is detected in the image data on the last page of the document, the control unit compares the position of the stripe pattern in the image data on a page of the document, which is scanned before the last page of the document, with the position of the stripe pattern in the image data on the last page of the document to cause the display unit to display the detection of the stripe pattern if a difference in position between the stripe patterns is over a predetermined threshold value.

14. The image forming apparatus according to claim 10, wherein, if the stripe pattern is detected in the image data on the last page of the document, the control unit compares the position in a primary scanning direction of the stripe pattern in the image data on a page of the document, which is scanned before the last page of the document, with the position in the primary scanning direction of the stripe pattern in the image data on the last page of the document to cause the display unit to display the detection of the stripe pattern if a difference in position between the stripe patterns is over a predetermined threshold value.

15. The image forming apparatus according to claim 10, wherein, if the stripe pattern is detected in the image data on the last page of the document, the control unit compares the position of the stripe pattern in the image data on a page of the document, which is scanned before the last page of the document, with the position of the stripe pattern in the image data on the last page of the document to cause the display unit to display a guidance image prompting a user to clean the scanning face if a difference in position between the stripe patterns is over a predetermined threshold value.

16. The image forming apparatus according to claim 10, wherein, if the stripe pattern is detected in the image data on the last page of the document, the control unit compares the position in a primary scanning direction of the stripe pattern in the image data on a page of the document, which is scanned before the last page of the document, with the position in the primary scanning direction of the stripe pattern in the image data on the last page of the document to cause the display unit to display a guidance image prompting a user to clean the scanning face if a difference in position between the stripe patterns is over a predetermined threshold value.

* * * * *